Dec. 8, 1959  T. VAN METER  2,916,041
POWER TRANSMISSION
Filed May 24, 1955

INVENTOR.
THEODORE VAN METER
BY
Ralph L. Tweedle
ATTORNEY

United States Patent Office 2,916,041
Patented Dec. 8, 1959

2,916,041

POWER TRANSMISSION

Theodore Van Meter, Oak Park, Mich., assignor to Vickers Incorporated, Detroit, Mich., a corporation of Michigan Application May 24, 1955, Serial No. 510,714

4 Claims. (Cl. 137—117)

This invention relates to power transmissions, and is particularly applicable to those of the type comprising two or more fluid pressure energy translating devices, one of which may function as a pump and another as a fluid motor.

More particularly the invention relates to a flow control system for such a transmission in which the pump is driven by a variable speed prime mover, such as the engine of a motor vehicle.

In such transmissions the fluid actuated accessories often require as high a rate of fluid supply during engine idle periods as during high speed engine operation. For example, this is true in the case of a steering booster. Thus, where a constant displacement pump directly driven from the vehicle engine is utilized, the pump discharge flow rate at engine idle must be sufficiently high for satisfactory accessory operation. As engine speed increases, so also does the discharge rate of the pumping mechanism. In the usual motor vehicle the ratio of engine idle speed to top speed is approximately one to ten. Thus, there is an over-supply of fluid at all times when engine speeds are substantially above idle. Where precise control is required, as in steering, this variable over-supply presents a serious problem.

Figure 1:
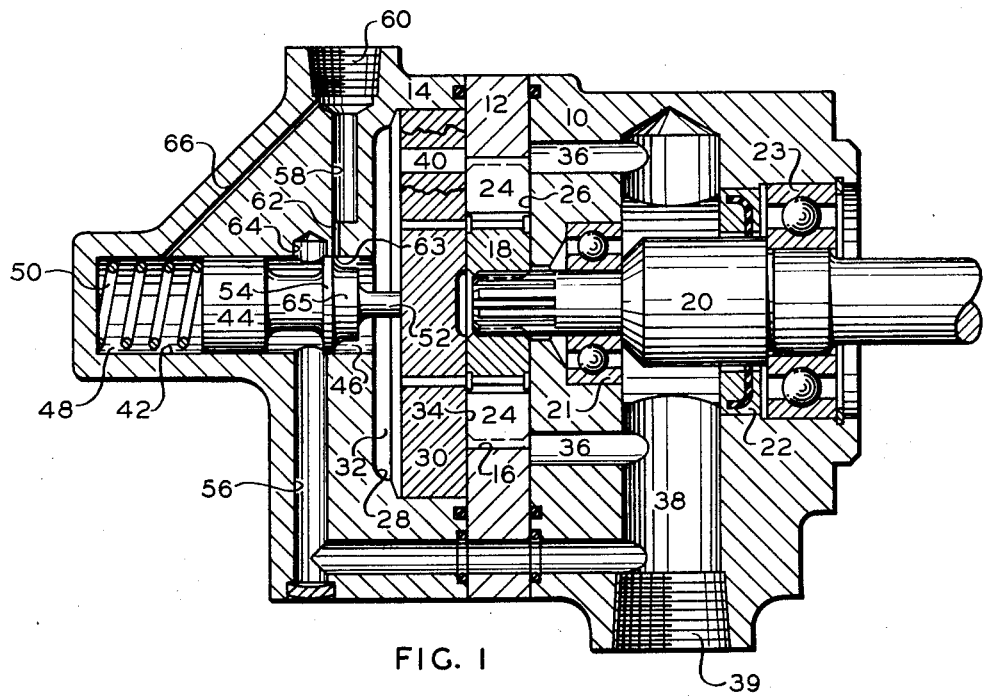

The prior art has attacked the problem of fluid-oversupply to the load by providing spill-over, or by-pass, type flow controls in the system. The usual arrangement has a by-pass valve at the pump outlet which is spring biased to a closed position in which all fluid pumped goes to the load. A restriction to fluid flow in the motor line creates a pressure differential which is proportional to the flow rate to the work and this differential is utilized to control the by-pass valve. When flow to the work reaches a certain desired magnitude, the pressure differential overcomes the valve spring and causes the by-pass valve to shift and thus divert pumped fluid away from the work and back to the reservoir. When the cracking point of the by-pass valve has been reached, further increases in pumping rate result in greater opening of the valve and increased flow of by-pass fluid. Such a spill-over type valve is shown in Figure 1 of the patent to Amsler, No. 1,467,522.

The above described arrangement has been quite satisfactory but has one important disadvantage. This disadvantage results largely from the rate characteristics of the biasing springs used in the by-pass valve. Due to the spring rate, an increasing pressure differential is required to move the by-pass valve from the cracking position to the wide open position. An additional factor is the velocity effect of the fluid being by-passed, which may act on the by-pass valve with the effect of increasing spring load. Since the valve actuating pressure differential is proportional to flow rate to the work, flow rate to the work must increase as the valve moves from cracking to wide open. The consequent increase in flow rate to the work resulting from variations in pump speed above the valve cracking point is of substantial magnitude and has been found detrimental to precise control in such applications as steering systems.

Further, extremely high pump speeds are normally associated with high vehicle speeds. Since at high vehicle speeds maneuvers are of necessity limited, a high rate of supply to the steering booster is not required. If the high supply rate is continued, it results in waste of power and excessive heating of the oil. Thus, power can be conserved and operating temperatures reduced by lowering the flow rate to the booster during high speed vehicle operation.

It is an object of this invention to provide an improved, low cost fluid flow control system for delivering a substantially constant fluid flow rate to a load from a variable flow rate source, throughout a wide range of operating speeds.

It is a further object to provide such a system in which the flow rate is more accurately controllable than in prior devices and, if desired, can be made to diminish with increasing pump speed.

Another object is to provide such a system which is well adapted for application to conventional pumping structures of the vane type.

It is also an object to provide low cost pumping structure having such a system incorporated therein.

Further objects and advantages of the present invention will be apparent from the following description, reference being had to the accompanying drawing wherein a preferred form of the present invention is clearly shown.

In the drawing:

Figure 1 is a longitudinal cross-sectional view of pumping structure incorporating the present invention.

Figure 2:
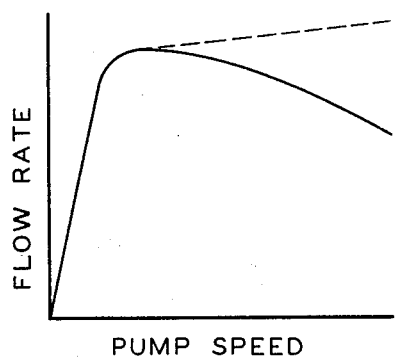

Figure 2 compares actual preformance curves of a pump and flow control valve embodying the present invention and a conventional pump and flow control valve.

Referring now to Figure 1, there is shown pumping structure of the general type described in the patent to Gardiner et al., No. 2,544,988. The pumping structure includes a body member 10, a ring 12, and a head 14. The ring 12 has an elliptically shaped chamber 16 in which a rotor 18 is telescopically disposed. Rotor 18 is supported on and driven by a drive shaft 20 which is rotatably carried on bearings 21 and 23. The usual shaft seal 22 is provided to prevent leakage from the body 10 at the point of emergence therefrom of the shaft 20. Rotor 18 has a plurality of radial slots therein, each of which carries a vane 24. The vanes 24 extend from rotor 18 to abut the elliptical track 16 in ring 12. Rotor 18, ring 12, and vanes 24 are axially abutted at one side by a plane face 26 of the body member 10.

The head 14 includes a recess 28 in which is positioned a pressure plate 30. The periphery of pressure plate 30 engages the chamber 28 in a fluid sealing relation therewith to form a pressure chamber 32. Fluid pressure in chamber 32 biases pressure plate 30 rightwardly and urges the plane face 34 of pressure plate 30 into axial abutment with ring 12, rotor 18, and vanes 24. When the rotor 18 is driven by shaft 20, the outer ends of the vanes 24 will follow the cam track 16. The intervane working chamber between each pair of adjacent vanes will undergo alternate expansion and contraction due to outward and inward movement of the vanes, induced by track 16. The expanding interval chambers communicate with inlet ports 36 which lead to an inlet manifold chamber 38. Manifold chamber 38 is connected to an external inlet connection port 39. The contracting intervane working chambers discharge fluid under pressure through a pair of delivery ports 40 in the pressure plate 30, only one of which is shown, into the pressure chamber 32. The pumping structure thus far described is similar in nature to that in the Gardiner et al. patent. A more detailed description may be obtained by reference to that patent.

There is provided in the head 14 a valve bore 42 which receives a control valve 44. Valve 44 divides the bore 42 into a pair of opposed pressure chambers 46 and 48, and has equal and opposed areas exposed to pressure in those chambers. The valve 44 is biased to the position illustrated by a spring 50, wherein the valve nose 52 abuts the pressure plate 30. Valve 44 includes a land 54 which, in the spring biased position illustrated, blocks communication between the pressure chamber 46 and a by-pass and return passage 56 which intersects bore 42 and extends to the inlet manifold 38. Valve pressure chamber 46 communicates directly with the pump pressure chamber 32.

A delivery passage generally designated 58 extends from the chamber 46 to an external delivery connection port 60. Passage 58 includes a restricted portion 62 which intersects the chamber 46 at a pick off point 63 closely proximate to the extension 64 of the by-pass passage 56. A fluid directing shoulder 65 on spool 44 reduces the cross sectional area of chamber 46 in the region of pick off point 63. The location of the point of connection between chamber 46 and delivery passage 58 and the provision of the fluid directing shoulder 65 are important features of the invention, as will be hereinafter explained.

A restrictive drilled passage 66 extends from the delivery passage 58 at a point downstream from the restriction 62 to communicate with the valve pressure chamber 48. Valve 44 is responsive to pressure differentials between chambers 46 and 48 to shift against the bias of spring 50 and effect modulated communication between chamber 46 and the by-pass and return passage 56.

In slow speed pump operation, the entire quantity of fluid pumped will pass into the pressure chamber 32 and through the restriction 62 in delivery conduit 58 to the external delivery connection port 60. During such low speed operation the spring 50 will maintain the flow control valve 44 in the closed position, wherein the valve pressure chamber 46 is isolated from the by-pass and return passage 56. As the speed of the pumping mechanism is increased, the discharge rate will also increase. A point will be reached at which the flow rate through the delivery passage 58 produces a pressure drop across restriction 62 which, reacting across valve spool 44, will overcome the spring 50 and shift valve 44 to its cracking position, wherein initial communication is established between the chamber 46 and the by-pass return passage 56. In the conventional system, wherein delivery passage 58 would extend directly from pressure chamber 32, the metered flow rate would continue to increase with increasing pump speed. This is due to the rate of the valve biasing spring and the velocity effect of the by-pass fluid on the end of valve spool 44. The metered flow curve of such a conventional system is shown by the dotted curve of Figure 2. The continuously increasing metered volume has a most adverse effect on efficiency and cooling in the high-speed ranges. Since pressure drop through, for example, an open center load valve will increase, so will the pressure drop in the fluid by-passed by the flow control valve. The pressure energy of the by-passed fluid is nearly all converted to heat, much power is wasted, and cooling problems become highly critical.

The metered flow rate vs. pump speed curve of a pump and valve combination embodying the present invention is shown by the solid line in Figure 2. The drooping curve is made possible by the disposition of various ports and passages as hereinbefore set forth. As the pump speed increases past the point where full delivery through restriction 62 causes valve 44 to crack, an additional factor becomes of increasing importance in the control of valve 44. As was heretofore described, delivery passage 58 is in communication with chamber 46 at a point closely proximate to the point at which by-pass passage 56 intersects bore 42, at which point the valving action of land 54 takes place. As increasing flow takes place through the chamber 46 and is by-passed to passage 56, the pressure at pick off point 63 will drop relative to pressure in chamber 32 and elsewhere in chamber 46. This is due to the high velocity of the by-pass fluid as it approaches the small area of the variable orifice formed by land 54 and the by-pass passage 56. Shoulder 65 further helps to localize the high velocity zone. This reduced pressure due to velocity acts on the right end of spool 44 only in a limited area proximate to the by-pass valve orifice. The higher pressures of chambers 32 and 46 act on the remainder of the right end of spool 44. Since it is the pressure at the pick off point 63 which, less the pressure drop across restriction 63, is conducted to the pressure chamber 48, there is a component of the differential applied across valve 44 which is not a function of flow rate to the load. That component is substantially proportional to pump speed after cracking of valve 44. It is thus possible to increase the operating force on valve 44 and divert an increasing amount of fluid into the by-pass passage without increase in the metered flow rate. In fact, as shown by Figure 2, the metered flow rate can actually be made to fall off during increasing pump speed.

The present invention has provided a fluid pump and flow control unit for supplying a desired flow rate to a work load at varying pump speeds. The control is responsive to both flow rate to the load, and to pump speed. Speed responsiveness has been obtained without undue complication of the pumping structure and without appreciably increasing the cost. Conventional structure may be easily adapted to practice of this invention.

While the form of embodiment of the invention as herein disclosed constitutes a preferred form, it is to be understood that other forms might be adopted, all coming within the scope of the claims which follow.

What is claimed is as follows:

1. A fluid flow control system for delivering a controlled flow rate to a load from a variable flow rate source, comprising: a valve bore; a pressure differential responsive valve member disposed in the bore to form first and second opposed pressure chambers, said valve member presenting opposed areas to said chambers, said first chamber communicating with said source; a by-pass valve port in said valve bore, controlled by the valve member to provide a variable orifice for diverting a varying rate of fluid flow from said first chamber; and delivery passage means for supplying fluid only to said load, having a flow sensing restriction therein, said delivery passage having its point of origin in said first chamber at a point closely proximate to said variable orifice, in the region of high velocity flow during fluid diversion, said delivery passage communicating with said second chamber from a point downstream of said restriction.

2. A fluid flow control system for delivering a controlled flow rate to a load from a variable flow rate source, comprising: a body; a valve bore in said body; a pressure differential responsive valve member disposed in the bore to form first and second opposed pressure chambers, said valve member presenting opposed areas to said chambers, said first chamber communicating with said source; a by-pass valve port in said valve bore, controlled by the valve member to provide a variable orifice for diverting a varying rate of fluid flow from said first chamber; and delivery passage means in said body for supplying fluid only to said load, having a flow sensing restriction therein, said delivery passage having its point of origin in said first chamber at a point closely proximate to said by-pass valve port, in the region of high velocity flow during fluid diversion, said delivery passage communicating with said second chamber from a point downstream of said restriction.

3. A fluid flow control system for delivering a controlled flow rate to a load from a variable flow rate source, comprising: a valve bore; a pressure differential responsive valve member disposed in the bore to form first and second opposed pressure chambers, said valve member presenting opposed areas to said chambers, said first chamber communicating with said source; a by-pass valve port in said valve bore, controlled by the valve member to provide a variable orifice for diverting a varying rate of fluid flow from said first chamber; delivery passage means for supplying fluid only to said load having a flow sensing restriction therein, said delivery passage having its point of origin in said first chamber at a point closely proximate to said variable orifice, in the region of high velocity flow during fluid diversion, said delivery passage communicating with said second chamber from a point downstream of said restriction; and fluid directing means reducing the cross sectional area of said first chamber proximate to said variable orifice.

4. A fluid flow control system for delivering a controlled flow rate to a load from a variable flow rate source, comprising: a valve bore; a pressure differential responsive valve member disposed in the bore to form first and second opposed pressure chambers, said valve member presenting opposed areas to said chambers, said first chamber communicating with said source, a by-pass valve port in said valve bore, controlled by the valve member to provide a variable orifice for diverting a varying rate of fluid flow from said first chamber; delivery passage means for supplying fluid only to said load, having a flow sensing restriction therein, said delivery passage having its point of origin in said first chamber at a point closely proximate to said variable orifice, in the region of high velocity flow during fluid diversion, said delivery passage communicating with said second chamber from a point downstream of said restriction; and fluid directing means carried by said valve member for reducing the cross sectional area of said first chamber proximate to said variable orifice.

References Cited in the file of this patent

UNITED STATES PATENTS

| | | |
|---|---|---|
| 2,103,299 | Ravnsbeck | Dec. 28, 1937 |
| 2,374,411 | Grant | May 8, 1945 |
| 2,456,651 | Schmiel | Dec. 21, 1948 |
| 2,622,611 | Stark | Dec. 23, 1952 |
| 2,656,846 | Anderson | Oct. 27, 1953 |
| 2,665,704 | Kanuch | Jan. 12, 1954 |
| 2,676,463 | Klessig | Apr. 27, 1954 |
| 2,771,844 | Lipinski | Nov. 27, 1956 |
| 2,782,718 | Pettibone | Feb. 26, 1957 |